United States Patent
Legatti

[15] 3,666,993
[45] May 30, 1972

[54] STATIC HAZARD DETECTOR FOR ISOLATED ALTERNATING CURRENT SUPPLY LINES

[72] Inventor: Raymond H. Legatti, Clearwater, Fla.
[73] Assignee: Electromagnetic Industries, Inc., Clearwater, Fla.
[22] Filed: May 13, 1971
[21] Appl. No.: 143,096

[52] U.S. Cl.............................317/18 R, 317/27 R, 317/33 R, 317/43, 317/53, 323/9, 324/110, 340/255
[51] Int. Cl..................................................H02h 3/28
[58] Field of Search..................317/18 R, 27 R, 18 D, 33 R, 317/43, 53; 323/9; 340/255; 324/110

[56] References Cited

UNITED STATES PATENTS

| | | | |
|---|---|---|---|
| 3,440,492 | 4/1969 | Carmody | 317/27 R |
| 3,535,589 | 10/1970 | Bourgeault | 317/27 R |
| 3,543,092 | 11/1970 | Hoel | 317/27 R |
| 3,513,352 | 5/1970 | Souillard | 317/27 R |
| 3,515,943 | 6/1970 | Warrington | 317/27 R |

Primary Examiner—James D. Trammell
Attorney—John J. McGlew and Alfred E. Page

[57] ABSTRACT

First and second resistors are connected in series with respective capacitors at first and second junction points. The two R-C series combinations are connected between the two line conductors of an isolated AC supply line, with each capacitor being connected to a different line conductor. Each junction point is connected to one terminal of a respective full wave rectifier, and the opposite terminals of the two full wave rectifiers are connected to a third junction point. Current flow through each rectifier is controlled by a respective transistor, and the transistors are alternately triggered conductive by an oscillator. A photoelectric resistor, such as a cadmium sulphide resistor, is connected in series between the third junction point and one terminal of a third full wave rectifier having an AC potential supply thereto so as to serve as an interposed source of DC potential. A lamp subjected to the voltage of the supply line is operatively associated with the photoelectric resistor so that the impedance of the detector circuit, or the "-source impedance," is varied so that the detector current is maintained at a constant value over the entire voltage range of from 102v to 132v, for a nominal 120v AC supply.

The other terminal of the DC source is connected to one terminal of a milliammeter whose opposite terminal is grounded, and diode means are connected to the milliammeter so that fault current can flow therethrough in only one direction. The milliammeter, through the mentioned circuitry, is connected alternately to the first and second junction points for flow of fault current alternately from the line conductors in only one direction to ground through the milliammeter. A switching relay controls signal lights and an alarm, and normally maintains a "safe" lamp illuminated. Upon occurrence of a fault current flow through the milliammeter, an amplifier amplifies the fault current to energize the relay to switch connections to sound an alarm, to illuminate a "hazard" lamp, or to do both. Phase shift adjustment means are associated with the R-C series combinations, and a diode is connected in by-pass relation with the third full wave rectifier to direct reverse current flow in by-pass relation to the third full wave rectifier.

12 Claims, 2 Drawing Figures

Patented May 30, 1972

INVENTOR.
RAYMOND H. LEGATTI
BY
John J. McGlew
ATTORNEY

STATIC HAZARD DETECTOR FOR ISOLATED ALTERNATING CURRENT SUPPLY LINES

BACKGROUND OF THE INVENTION

As mentioned in Kusters et al., U.S. Pat. No. 2,999,231 and McKinley et al., U.S. Pat. No. 3,066,284, both assigned to the National Research Council of Canada, the National Fire Protection Association recommends use of an ungrounded alternating current electrical distribution system in electrically sensitive areas such as, for example, hospital operating rooms where anaesthetic is administered, delivery rooms, coronary care units, intensive care units, cardiac catheterization laboratories, angiographic laboratories, recovery rooms, emergency rooms, and dialysis units, and has recommended also that a "Line Isolation Monitor" be so arranged that a green signal lamp is displayed conspicuously so as to be visible to persons in the anaesthetizing locations, with such lamp to remain lit while the system remains isolated safely from ground. If a grounding impedance or fault of less than a predetermined value should become connected between any line conductor and ground, as for example by a connection having a resistance from 0 to 120,000 ohms, a red signal lamp and an audible warning signal is required to be energized. The maximum current that may flow in a low resistance fault by virtue of the presence of the detector is specified not to exceed 2 milliamperes.

The two mentioned patents disclose hazard detectors meeting these specifications, and also discuss the various types of fault impedances which may be encountered, such as purely resistive fault impedances, purely capacitive fault impedances, and various combinations of resistive and capacitive fault impedances. The magnitude of the maximum ground current which can be produced by deliberately choosing the worse location for a fault is a measure of the hazard of the system, and is termed, in the mentioned patents, the "Hazard Index" which can be quantitatively expressed in milliamperes. As also mentioned, any practical ground detector will obviously introduce a finite impedance between the system and ground, and the hazard index of an ideal ungrounded system with a ground detector associated therewith will no longer be zero. The actual index of such an ideal ungrounded system including a ground detector is called the "Detector Hazard Index," and the "Total Hazard Index" of a practical ungrounded supply with a ground detector connected therein is the sum of the AC currents due to fault impedances and the detector impedance, with the addition being effected vectorially.

Practical hazard detectors embodying the disclosures of the two U.S. patents mentioned above are available commercially, and meet the standards set forth by the National Fire Protection Association. However, the rate of switching between the two line conductors is of the order of only 2 cps, and the "Detector Hazard Index" is of the order of one-half of the "Total Hazard Index." In some cases, this relatively low switching rate can be uncomfortable to a patient on the operating table.

SUMMARY OF THE INVENTION

This invention relates to fault detector circuits for use with AC supply lines having line conductors isolated from ground and, more particularly, to an improved, simplified, more sensitive and more compact fault detector circuit or hazard detector circuit.

In accordance with the invention, a first capacitor and a first resistor are connected in series at a first junction point, to provide a first R-C combination, and a second capacitor and a second resistor are connected in series at a second junction point, to provide a second R-C combination. The two R-C combinations are connected between the line conductors of the AC supply line, with one capacitor being connected directly to one line and the other capacitor being connected directly to the other line. Each resistor has an impedance substantially equal in magnitude to that of one of the capacitors at the supply line frequency. Respective electronic switching and rectifying means connect the first and second junction points to a third common junction points, and are operable to effect current flow from the first and second junction points alternately and cyclically to the third junction point.

A variable impedance is connected in series between the third junction point and a source of DC potential, such as a full wave rectifier having an AC potential applied thereto from the supply line, and this impedance has an impedance magnitude which varies directly with the supply line voltage. In effect, a boosting DC potential is injected into the circuit including the impedance connected to the third junction point. A milliammeter is connected in series between the other terminal of the injected or interposed DC source and ground, for alternating connection to the first and second junction points for flow of fault current alternately from the line conductors in only one direction to ground through the milliammeter. Diode means are connected to the milliammeter and block current flow through the milliammeter in the reverse direction.

A visible and audible alarm and warning system is connected substantially in parallel with the milliammeter, and includes an amplifier for the current through the milliammeter and a relay which is controlled by the amplifier. This relay has contacts controlling energization of a "safe" lamp, a "hazard" lamp and a buzzer.

The detector circuit has a maximum of 500 microamperes detector hazard index for a total hazard index of 2 milliamperes, which is one-quarter or less of the total index. The electronic switching and rectifying means effect switching between the two line conductors at 37 cps, which is more beneficial to a patient on an operating table than is the switching at 2 cps or less, which can be very annoying to such a patient. In addition, the variable impedance connected between the third junction point and the full wave rectifier maintains the detector current at a constant value over the entire voltage range for a nominal 120v supply line voltage, within the limits of a 15 percent decrease in voltage, or 102v, or a 10 percent increase in voltage, or 132v.

An object of the invention is to provide an improved fault detector circuit for ungrounded AC supply lines.

Another object of the invention is to provide such a fault detector circuit which is simpler, more compact, and has a lower detector hazard index than known fault detector circuits.

A further object is to provide such a fault detector circuit in which the detector current is maintained at a constant value over the entire voltage range of the AC supply line.

Another object of the invention is to provide such a fault detector circuit having a switching frequency which is much higher than those hitherto used and is not annoying to a patient on an operating table.

A further object of the invention is to provide such a fault detector circuit which is simple and compact in construction and relatively inexpensive.

For an understanding of the principles of the invention, reference is made to the following description of typical embodiments thereof as illustrated in the accompanying drawing.

DESCRIPTION OF THE PREFERRED EMBODIMENTS

Figure 1:
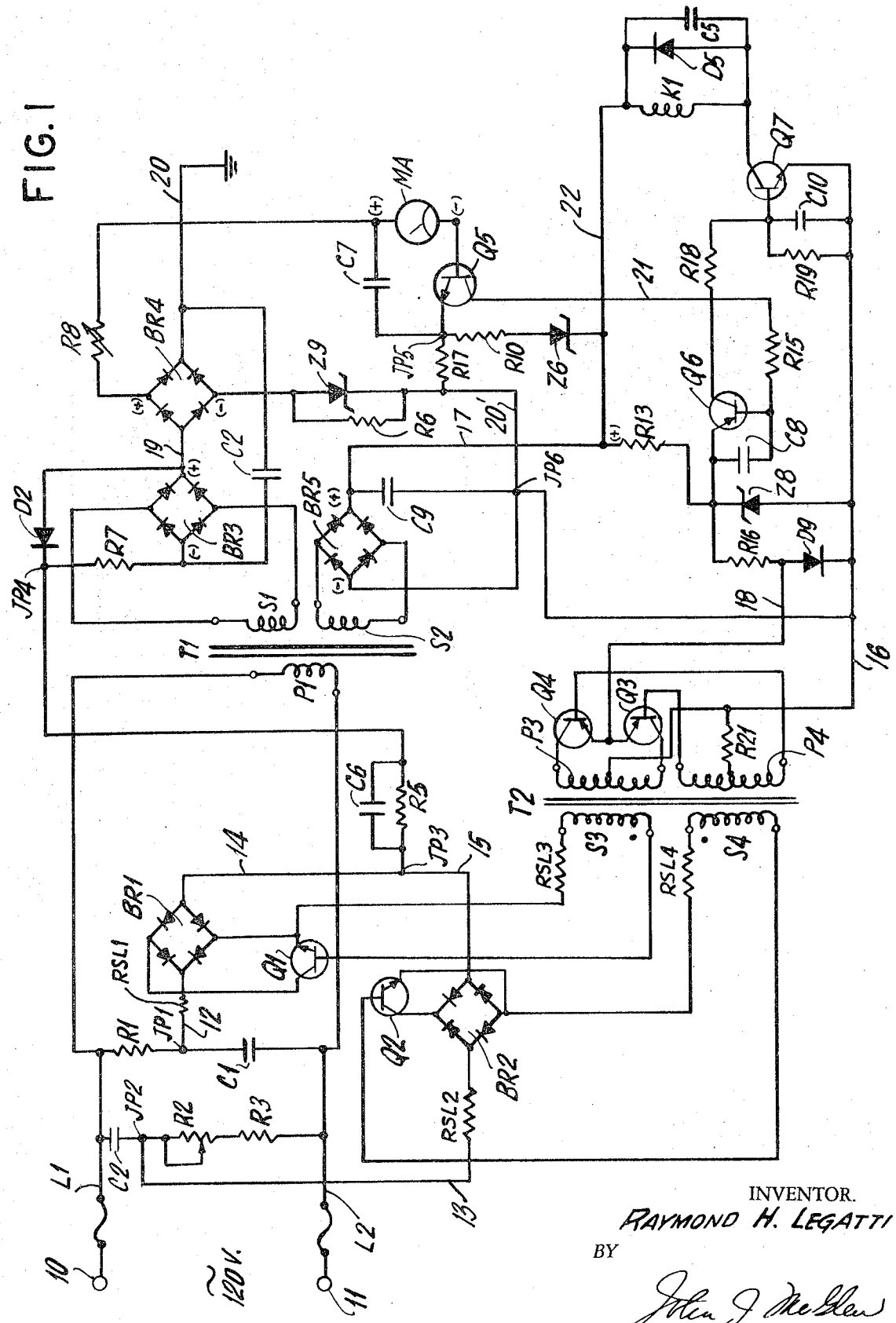
FIG. 1 is a schematic wiring diagram of one form of fault detector circuit embodying the invention.

Referring first to FIG. 1, an AC supply line, having line conductors L1 and L2 isolated from ground, has an AC potential of, for example, 120v, applied thereto at terminals 10 and 11. The AC supply line is subject to probable connection to ground by any combination of resistive and capacitive fault impedances. The fault detector circuit embodying the invention is connected between isolated line conductors L1 and L2 and ground.

In accordance with the invention, a first resistor R1 is connected in series with the first capacitor C1 at a junction point JP1, with resistor R1 being connected to line L1 and capacitor C1 being connected to line L2. Also, a resistor R2 is connected in series with a capacitor C2 at a junction point JP2, with resistor R2 being connected to line L2 through resistor R3, and capacitor C2 being connected to line L1. A conductor 12 connects junction point JP1 to one terminal of a rectifier bridge BR1 through surge limit resistor RSL1, and a conductor 13 connects junction point JP2 to one terminal of a rectifier bridge BR2 through surge limit resistor RSL2. The opposite terminals of the rectifier bridges BR1 and BR2 are connected by respective conductors 14 and 15 to a common junction point JP3. Flow of current from conductor 12 to conductor 14 through rectifier bridge BR1 is controlled by a transistor Q1 whose collector-emitter circuit is connected across the other two terminals of rectifier bridge BR1. Similarly, flow of current from conductor 13 to conductor 15, through rectifier bridge BR2, is controlled by a transistor Q2 whose collector-emitter circuit is connected across the other two terminals of rectifier bridge BR2. RSL2 and RSL3 are two additional surge current limiting resistors which suppress the transients produced by the fast semi-conductor switching.

A transformer T1 has its primary winding P1 connected across isolated line conductors L1 and L2. Transformer T1 has secondary windings S1 and S2. For a purpose to be described, secondary winding S1 is connected across a pair of opposite terminals of a rectifier bridge BR3. Secondary winding S2 has a rectifier bridge BR5 connected between its opposite end terminals.

A second transformer T2 has primary windings P3 and P4 and secondary windings S3 and S4, polarized as indicated by the dots. A conductor 16 connects one DC output terminal of bridge BR5 to the midpoint of primary winding P3 and, through a resistor R21, to the midpoint of winding P4. A conductor 17 connects the positive DC output terminal of bridge BR5, through series resistors R13 and R16, to a conductor 18 connected in common to the emitters of a pair of transistors Q3 and Q4 constituting an oscillator. The collectors of transistors Q3 and Q4 are connected to respective opposite terminals of primary winding P3, and their bases are connected to respective opposite terminals of primary winding P4. Secondary winding S3 of transformer T2 is connected across the base-emitter circuit of transistor Q1, and secondary winding S4 is connected across the base-emitter circuit of transistor Q2.

With the arrangement thus described, transistors Q1 and Q2 are triggered conductive alternately and cyclically to correspondingly render rectifier bridges BR1 and BR2 conductive alternately and cyclically so that current will flow from junction points JP1 and JP2 to junction point JP3 alternately and cyclically. Thus, the isolated line conductors L1 and L2 are "sampled," for fault impedances, alternately and cyclically. Preferably, the oscillator comprising transistors Q3 and Q4, and their associated components, effects switching between isolated line conductors L1 and L2 alternately and cyclically at 37 cps. A capacitor C9, connected between conductors 16 and 17, filters the DC output voltage of rectifier bridge BR5, as to remove ripples therefrom. A Zener diode Z8, connected between conductors 16 and 17 through resistor R13 maintains a voltage to the oscillator and amplifier, which is substantially constant. A diode D9 is connected between conductors 16 and 18 for improved regulation of the oscillator voltage.

The two terminals of bridge BR3, connected to the opposite ends of secondary winding S1 of transformer T1, will be referred to as the AC input terminals. Secondary winding S1, in conjunction with rectifier bridge BR3, serves to inject or interpose an additional DC voltage in series with the voltage at junction point JP3. For this purpose, an impedance, comprising a resistor R5 connected in parallel with a capacitor C6, is connected between junction point JP3 and a junction point JP4 which is, in turn, connected through a series resistor R7 to a DC input terminal of rectifier bridge BR3. For a purpose to be described, a diode D2, polarized reversely to rectifier bridge BR3, is connected between the DC output terminal of rectifier bridge BR3 and junction point JP4. Preferably, the impedance comprising the resistor R5 and the capacitor C6 is a voltage variable impedance, whose impedance value increases with increasing voltage between isolated line conductors L1 and L2, so as to maintain the detector current substantially constant over the full range of voltages which, based upon a nominal 120v AC supply, with a 15 percent decrease and a 10 percent increase, ranges from 102v to 132v AC.

The DC output terminal of rectifier bridge BR3 is connected by a conductor 19 to an input terminal of rectifier bridge BR4, and the opposite output terminal of rectifier bridge BR4 is connected to ground by a conductor 20. A capacitor C2 is connected between the DC input terminal of rectifier bridge BR3 and the grounded output terminal of rectifier bridge BR4, for phase correction. The fault impedance detection circuit is connected across the other two terminals of rectifier bridge BR4.

This fault detecting circuit includes an adjustable resistor R8 connected between one of these two terminals of bridge BR4 and a terminal of an indicating instrument, such as a milliammeter MA, and the other terminal of milliammeter MA, which is the negative terminal, is connected to the base of a transistor Q5. A filter capacitor C7 is connected between the positive terminal of milliammeter MA and the emitter of NPN transistor Q5, at a junction point JP5. A resistor R17 connects junction point JP5 to a conductor 20 connected to conductor 16 at its junction point JP6 with capacitor C9. Conductor 20 is connected, through a Zener diode 29 in parallel with a resistance R6, to the negative output terminal of bridge BR4.

By virtue of the interposition of a DC potential between the junction point JP3 and meter MA, by the bridge BR3, there is always a small current flow through meter MA even in the absence of a fault. In the event of a balanced fault, the interposed source of DC potential results in the resistances on one side being effectively connected in series rather than in parallel. One of these resistances would be the resistor R1 or the resistor R2, and the other resistance would be the fault impedance, acting as a resistive fault. Consequently, the detector circuit is able to detect balanced faults, either resistive faults or capacitive faults.

The secondary winding S2 of transformer T1, in association with rectifier bridge BR5, in addition to supplying the operating potential for the oscillator comprising transistors Q3 and Q4, also supplies potential for a relay operating coil K1 which transfers, upon detection of a fault, to extinguish a "safe" lamp, to light a "hazard" lamp and to energize a warning buzzer. Only the relay operating coil K1 is shown in FIG. 1, and the circuits controlled thereby will be described further in connection with FIG. 2 which illustrates these circuits.

The signalling circuit comprises a conductor 21 connected to the collector of transistor Q5 and, through a resistor R15, to the base of a transistor Q6 forming part of an amplifier for amplifying the relay operating current. Thus, when transistor Q5 is triggered conductive by the flow of a fault current through meter MA, transistor Q6 will also be triggered conductive. A zener diode Z6 and a resistor R10 are connected between junction point JP5 and a conductor 22 connected between conductor 17 and one terminal of relay operating coil K1. Zener diode Z6, in associated with resistors R10 and R17, constitutes a compensating circuit, with Zener diode Z6 maintaining a constant voltage and bridge BR5 supplying a variable voltage. The voltage drop provided by the resistors R10 and R17 is linear, as the voltage across Zener diode Z6 is constant. Resistors R10 and R17 are selected for the right proportion of the correction. The voltage level of Zener diode Z6 sets the slope of the correction.

Resistor R16 in series with diode D9 connects the emitter of transistor Q6 to the common conductor 16, and a Zener diode Z8 is connected in parallel with resistor R16 and diode D9 to maintain a substantially constant voltage between the collector of transistor Q6 and conductor 16. A capacitor C8 is connected between the emitter and base of transistor Q6. The collector of transistor Q6 is connected, in series with a resistor R18, to the base of a transistor Q7 whose collector is connected to the other terminal of relay operating coil K1. The emitter of transistor Q7 is connected to the common conductor 16, and a resistor R19 in parallel with a capacitor C10 is connected between the base and emitter of transistor Q7. A smoothing capacitor C5 is connected across relay operating coil K1 along with back EMF diode D5.

Transistors Q6 and Q7, with their associated components, constitute an amplifier having its operating potential supplied from secondary winding S2 through bridge BR5. The contacts controlled by relay operating coil K1 are normally in a position where a "safe" lamp is illuminated, a "hazard" lamp is not illuminated and a warning buzzer is silent. When milliammeter MA registers a hazardous fault current, transistor Q5 is triggered conductive to, in turn, trigger transistor Q6 conductive which also triggers transistor Q7 conductive so that an energizing current will flow through relay operating coil K1 and the collector-emitter circuit of transistor Q7 to transfer the contacts controlled by relay operating coil K1. This extinguishes the "safe" lamp, illuminates the "hazard" lamp and energizes the warning buzzer.

Figure 2:
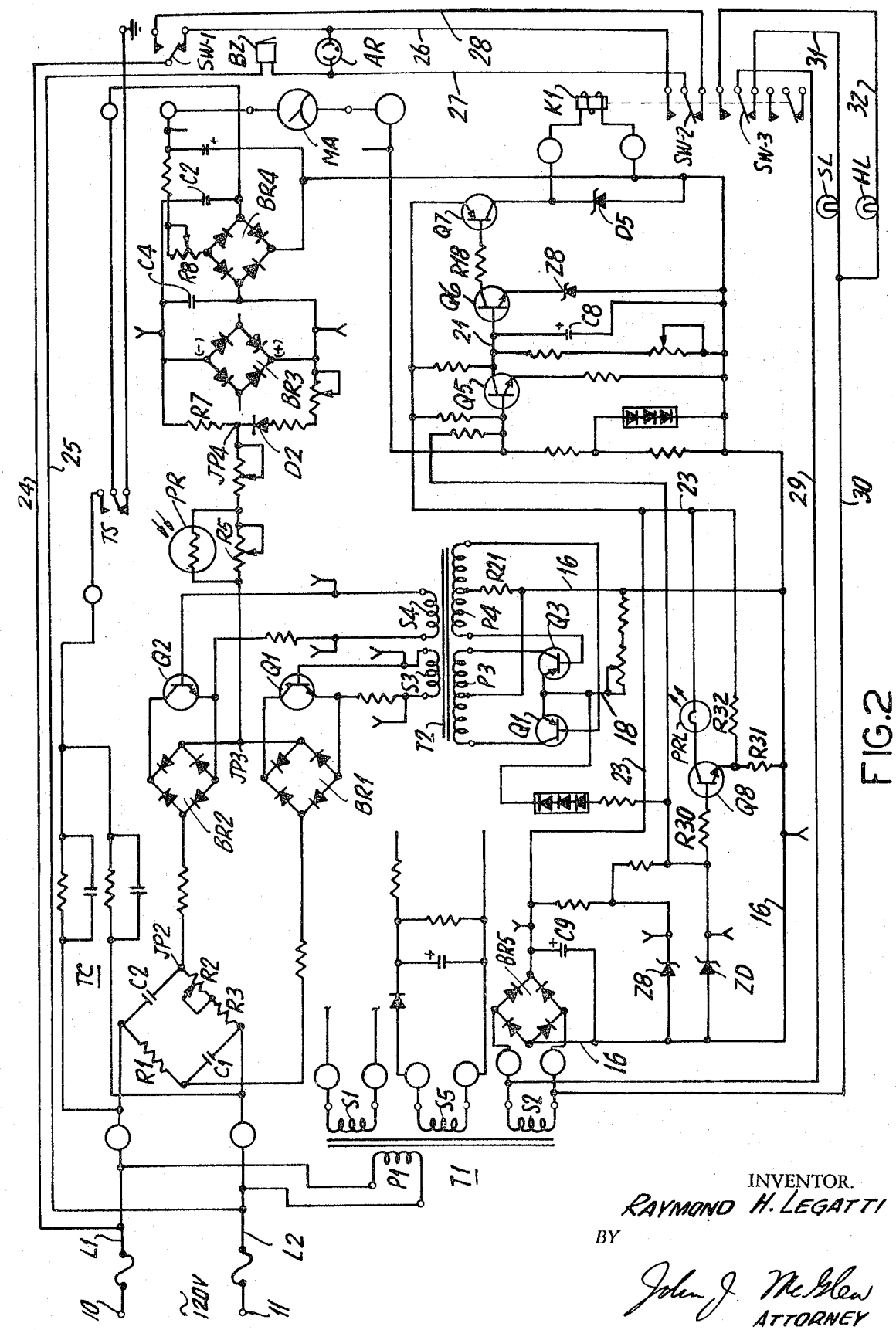
FIG. 2 is a schematic wiring diagram of a preferred form of fault detector circuit embodying the invention.

A preferred embodiment of the invention is shown in FIG. 2. This figure also illustrates the switches, lamps and buzzer controlled by relay operating coil K1. The embodiment of FIG. 2 differs from that of FIG. 1 in that the impedance, comprising the capacitor C6 in parallel with the resistor R5, connected between junction point JP3 and junction point JP4 is replaced by a supply voltage responsive impedance comprising a photo-resistor PR in parallel with an adjustable resistor R5. Photo-resistor PR may be, for example, a cadmium sulphide element, which has light directed thereupon from a photo-resistor lamp PRL whose illumination is a function of the supply voltage. The arrangement is such that, as the supply voltage increases, the illumination of lamp PRL decreases so that the resistance of photo-resistor PR increases, and vice-versa. With a nominal supply voltage of 120v AC, the source impedance is varied so that the detector current is maintained at a constant value over the entire voltage range from 102v to 132v, representing a 15 percent decrease in the nominal voltage and a 10 percent increase therein. As is well understood by those skilled in the art, a cadmium sulphide photo-resistor is a pure resistance.

In view of the rather detailed description of FIG. 1, it is believed that only a description of the differences of FIG. 2, with respect to FIG. 1, need be mentioned. While there are minor changes in certain components, such as resistors and capacitors, in FIG. 2, as compared to FIG. 1, these do not in any way effect the underlying principle of operation of the hazard detector of the invention.

Referring to FIG. 2, a Zener diode ZD is connected to conductor 16, which conductor is connected to the midpoints of windings P3 and P4 of transformer T2, and, through a resistor R30, to the base of a transistor Q8. A resistor R31 connects the emitter of transistor Q8 to the common conductor 16. The collector of transistor Q8 is connected to one terminal of photo-resistor lamp PRL, whose other terminal is connected to a conductor 23 connected to an output terminal of rectifier bridge BR5. A resistor R32 is connected in parallel with lamp PRL and the collector-emitter circuit of transistor Q8.

With the described arrangement, as the voltage increases, transistor Q8 will become less conductive thus reducing the light output of photo-resistor lamp PRL. In turn, this will increase the resistance of photo-resistor PR in direct proportion to the increase in the supply line voltage. The detector current is maintained at a constant value over the entire range of supply line voltage from 102v AC to 132v AC.

Relay operating coil K1 controls single-pole double-throw switches SW-2 and SW-3. A conductor 24, connected to isolated line conductor L1, is connected, through a switch SW-1 to a conductor 26 connected to switch SW-2. A conductor 25, connected to isolated line conductor L2 is connected to one terminal of a buzzer BZ, and the other terminal of buzzer BZ is connected by a conductor 27 to switch SW-2. An "alarm ready" neon lamp is connected across conductors 26 and 27. In the illustrated position of switch SW-2, where relay energizing coil K1 is de-energized, neon lamp AR lights when a potential is applied to isolated line conductors L1 and L2. Upon occurrence of a fault impedance, an energizing current is supplied to relay operating coil K1, in the same manner as described with respect to FIG. 1, and switches SW-2 and SW-3 are transferred. The transfer of switch SW-2 energizes buzzer BZ to sound an alarm, and extinguishes lamp AR.

Conductors 29 and 30 are connected to the opposite terminals of secondary winding S2 of transformer T1, with conductor 29 being connected to switch SW-3 and conductor 30 being connected to one terminal of "safe" lamp SL and to one terminal of "hazard" lamp HL. Respective conductors 31 and 32 connect the other terminals of these two lamps through switch SW-3. In the illustrated de-energized position of relay operating coil or winding K1, switch SW-3 connects conductor 31 ro conductor 29, so that "safe" lamp SL is lit, and disconnects conductor 32 from conductor 29 so that "hazard" lamp HL is not lit. Upon transfer of switch SW-3 upon energization of relay coil or winding K1, conductor 32 is connected to conductor 29 and conductor 31 is disconnected from conductor 29. Consequently, "hazard" lamp HL is lit and "safe" lamp SL is extinguished.

In this embodiment of the invention, a third secondary winding S5 is provided on transformer T1 and provides a simple bias to bring meter MA back to a zero fault current reading, which is its own hazard index and which, with the illustrated circuitry, is 500 microamperes. This is for a 2 milliampere total hazard index, so that the detector hazard index is only one-quarter or less of the total hazard index.

The various other connections shown in FIG. 2 are provided for test purposes, including a test switch TS for connecting a test circuit TC between the isolated line conductors and ground to test the apparatus. Also, switch SW-1 acts as a test switch for testing buzzer BZ. Other terminals are provided for testing the various components of the circuit.

Despite its very low detector hazard index and its high switching rate of 37 cps, the fault detector circuit of the invention is much simpler, more compact, and lighter in weight than known fault detector circuits presently used as hazard indicators in operating rooms of hospitals and the like.

While specific embodiments of the invention have been shown and described in detail to illustrate the application of the principles of the invention, it will be understood that the invention may be embodied otherwise without departing from such principles.

What is claimed is:

1. For use with an AC supply line, having its line conductors isolated from ground and subject to probable connection to ground by any configuration of resistive and capacitive fault impedances, a fault detector circuit arranged for connection to said supply line and equally sensitive to balanced and unbalanced such fault configurations, said fault detector circuit comprising, in combination, a first capacitor and a first resistor connected in series at a first junction point; a second like capacitor and a second like resistor connected in series at a second junction point; said first capacitor and said second resistor being connected to one line conductor and said second capacitor and said first resistor being connected to the other line conductor, and each resistor having an impedance substantially equal in magnitude to that of one of said capacitors at the supply line frequency; a third junction point; switching and rectifying means operable to effect current flow from said first and second junction points alternately and cyclically to said third junction point; a source of DC potential; a variable impedance connected in series between said third junction point and one terminal of said source, and having an impedance varying directly with the supply line voltage; a milliammeter connected between the other terminal of said source and ground for alternating connection to said first and second junction points to provide a path for current flow alternately from said line conductors in only one direction to ground through said milliammeter; whereby, upon occurrence of any configuration of resistive and capacitive fault impedances, said capacitors and resistors connected between said isolated line conductors will effect a flow of fault current through said milliammeter; and means operatively connected to said milliammeter and blocking current flow through said milliammeter in the reverse direction.

2. A fault detector circuit, as claimed in claim 1, in which at least one of said first and second resistors is adjustable to compensate for phase shift.

3. A fault detector circuit, as claimed in claim 1, in which said source of DC potential comprises a full wave rectifier bridge having a pair of AC input terminals connected to a source of AC potential; said one terminal and said other terminal of said source comprising the other terminals of said rectifier bridge.

4. A fault detector circuit, as claimed in claim 3, in which said source of AC potential comprises a transformer having a primary winding connected across said isolated line conductors and a secondary winding connected to said AC input terminals of said rectifier bridge.

5. A fault detector circuit, as claimed in claim 1, in which said variable impedance comprises a third resistor and a third capacitor connected, in parallel with each other, between said third junction point and said one terminal of said DC source.

6. A fault detector circuit, as claimed in claim 1, in which said variable impedance comprises a photo-resistor connected between said third junction point and said one terminal of said source, a lamp operable to direct illumination upon said photo-resistor, and means connected to said AC supply line and controlling the illumination of said lamp as an inverse function of the supply line voltage, whereby the resistance of said photo-resistor varies as a direct function of the supply line voltage to maintain the detector current constant.

7. A fault detector circuit, as claimed in claim 1, in which said switching and rectifying means comprises respective full wave rectifier bridges each having a first terminal connected to a respective one of said first and second junction points and a second terminal connected to said third junction point; respective transistors each having its output circuit connected to the other two points of a respective rectifier bridge; and an oscillator effecting alternate triggering of said transistors to the conductive state.

8. A fault detector circuit, as claimed in claim 7, in which said oscillator is a transistorized oscillator energized from said AC supply line.

9. A fault detector circuit, as claimed in claim 3, including a second full wave rectifier bridge having a pair of opposite input terminals connected to said one terminal and said other terminal, respectively, of said first-mentioned rectifier bridge; said milliammeter being connected across the other two terminals of said second full wave rectifier bridge; and means connecting one input terminal of said second full wave rectifier bridge to ground.

10. A fault detector circuit, as claimed in claim 9, including a diode connected between said one and said other terminal of said first-mentioned full wave rectifier bridge to bypass reverse current flow therearound upon occurrence of a capacitive fault.

11. A fault detector circuit, as claimed in claim 1, including visual and audible hazard indicating means; relay contacts controlling connection of said indicator means to a source of potential; a relay operating coil controlling said relay contacts; and a transistor amplifier having an input connected to said milliammeter and an output circuit controlling connection of said relay operating coil to a source of potential; said transistor amplifier, responsive to a flow of fault current through said milliammeter, operating said relay operating coil to move said relay contacts to a position connecting said hazard indicator means to a source of potential to energize the same.

12. A fault detector circuit, as claimed in claim 11, in which said visual hazard indicator means comprises a hazard lamp; said audible hazard indicator means comprising a buzzer; and a "safe" lamp controlled by said relay contacts; said relay contacts, when said relay operating coil is deenergized, connecting said "safe" lamp to a source of potential and, upon energization of said relay operating coil, disconnecting said "safe" indicator lamp from the source of potential and connecting said hazard lamp and said buzzer to a source of potential.

* * * * *